Figure 1:
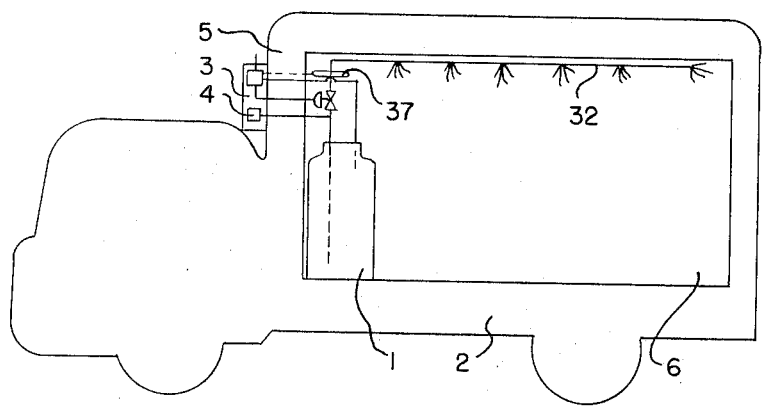

May 2, 1967 R. S. PAULIUKONIS 3,316,726
REFRIGERATION SYSTEM

Filed Sept. 9, 1965 3 Sheets-Sheet 1

INVENTOR
RICHARD S. PAULIUKONIS
BY
ATTORNEYS

May 2, 1967  R. S. PAULIUKONIS  3,316,726
REFRIGERATION SYSTEM

Filed Sept. 9, 1965  3 Sheets-Sheet 3

INVENTOR
RICHARD S. PAULIUKONIS
BY
ATTORNEYS

United States Patent Office 3,316,726
Patented May 2, 1967

3,316,726
REFRIGERATION SYSTEM
Richard S. Pauliukonis, Cleveland, Ohio, assignor to Ryan Industries, Inc., Cleveland, Ohio, a corporation of Ohio
Filed Sept. 9, 1965, Ser. No. 486,103
13 Claims. (Cl. 62—55)

This application is a continuation-in-part application with respect to my application Ser. No. 402,538, filed Oct. 8, 1964, now abandoned in favor of this application.

This invention relates to system controls for in-transit refrigeration system employing cryogenic fluids and/or other chemicals as refrigerants, and, more particularly, to an insulated body for transporting foods and/or other fresh or frozen commodity at controlled temperatures, by the use of chemicals, such as cryogenic liquid nitrogen, liquid air, or non-cryogenic liquid carbon dioxide, serving as coolants, which are housed inside the insulated cargo compartment in a cryogenic Dewar, while system controls are mounted in a control box external to the insulated body.

The invention thus has application in the refrigerated transport field for controlling temperatures of cargo located in an insulated body of a truck-trailer, railcar, or refrigerated ship, by the use of controlled spray of refrigerants, such as liquefield gases with boiling points below ambient air temperatures, requiring provision for remotely located, self-sustained, pneumatic or electric controls, which operate with minimum loss of liquefied gases.

In the use of liquefied gases as refrigerants, two significant characteristics are pertinent; namely, the filling losses during filling/refilling operations, and the operational losses during the operation of the system. From a cost standpoint, every single drop of the cryogenic fluid is important, and its waste is to be avoided if possible.

Due to flashing and extremely rapid evaporation of liquefied gases on contact with warm surfaces, such as metallic liquid transfer lines or pressure vessel parts of the Dewar, filling losses may be extremely large unless the control equipment is designed to reduce such losses to a minimum.

Due to the use of system components and/or controls which are normally provided with various purge and bleed openings, large amounts of cryogenic liquefied gases can be wasted.

Pneumatic systems and/or temperature controls are presently considered preferable from a reliability standpoint because they operate on vapor pressure of liquefied gases carried on board. Electric systems, used in place of pneumatic systems for temperature control, however, require an extra battery to operate electrical switches. The use of the battery is associated with a special maintenance program, which is not required in the pneumatic system. In addition, pneumatic systems lend themselves to closer low cost temperature control due to their modulating capability.

From the control standpoint, properly chosen components of both systems would perform well if provided with the design features which insure reduced filling losses. From the component size standpoint, the externally mounted electrical controls, located in a control box, are smaller in size than the controls of the pneumatic system. Existing electric controls employ small electric switches for actuation of remotely located solenoid valves. Existing pneumatic systems, on the other hand, employ multiplicity of comparably larger manual control valves, and, as such, result in a large, expensive, and inefficient control system.

It is, therefore, an object of the present invention to provide a control system which entails all necessary provisions for reduced filling losses regardless of whether the system is pneumatically or electrically controlled, and which provides optimum pneumatic controls for a transport refrigeration system utilizing an externally mounted, efficient, compact, and inexpensive control box.

Other objects and advantages of the invention will become apparent as the description proceeds in accordance with drawings. In some aspects, the invention is not necessarily limited to transport refrigeration systems.

FIGURE 1 illustrates the environment in which the invention in its several aspects may be used. FIGURES 2-5, inclusive, are schematic illustrations of various aspects of the invention.

FIGURE 1 illustrates the general arrangement of a transport refrigeration system. The insulated double-walled construction cryogenic Dewar 1 housing cryogenic fluids, such as liquefied nitrogen, liquefied air, and/or non-cryogenic carbon dioxide, is located inside the insulated body 2 of a truck-trailer, or the like, designated to carry cargoes at reduced temperatures. Its control box 3 is external to the said insulated body 2. The control box 3 houses various operating controls of the system, including the Dewar filling connection 4 and associated valves, and ensures an easy and safe access to the controls without entering the cargo compartment. Entering the cargo compartment requires opening the door, and subsequent temperture rise within the cargo compartment, and, as such, is not recommended due to poor economy, unless absolutely necessary. Also, safety considerations such as the danger of asphyxiation, or other hazards, dictate locating the operating controls external to the insulated body 2, FIGURE 1.

Figure 2:
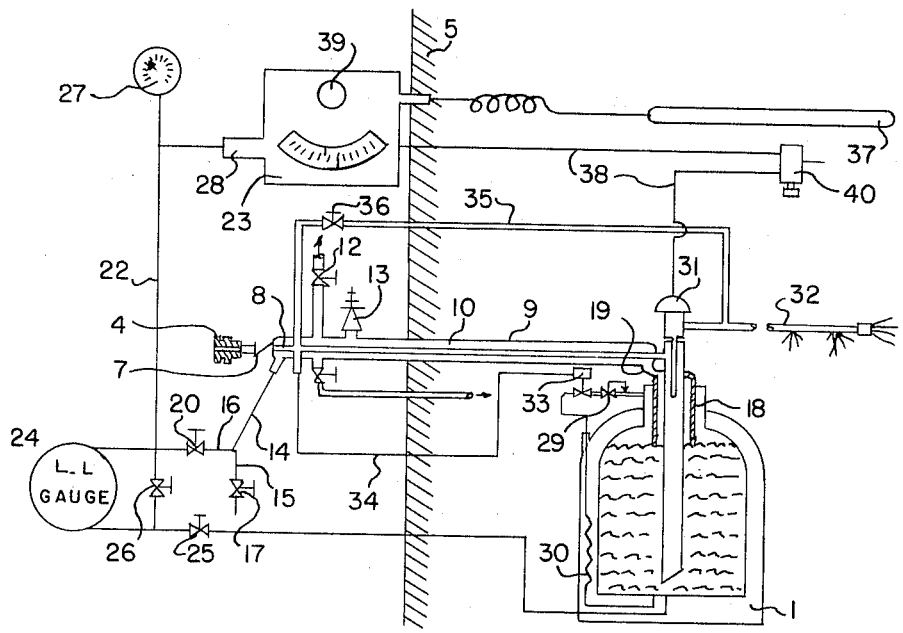
Figure 3:
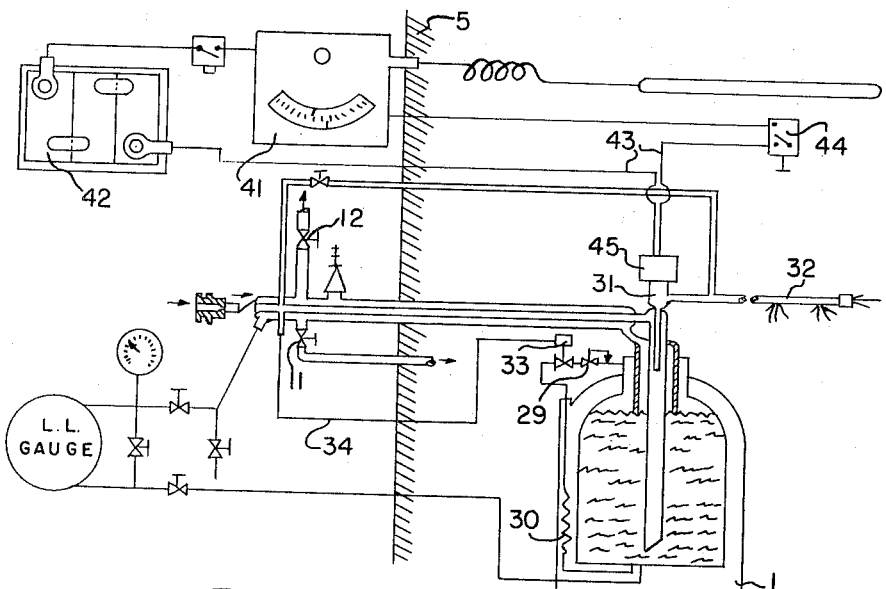

FIGURES 2 and 3 illustrate pneumatic and electric system controls respectively. FIGURE 2 identifies a system operated pneumatically by the vapor pressure of the liquefied gas carried on board. Controls shown on the left side of FIGURE 2 are system operating controls which are normally housed in the externally mounted control box 3, identified in FIGURE 1. The cryogenic Dewar 1, located in cargo compartment 6 and separated by the insulated wall 5 from the control box 3 as shown in FIGURE 1, is also depicted on the right side of the FIGURE 2. as separated by the same insulated wall 5.

In FIGURE 2, the filling connection 4 is provided with a check valve 7 and/or a manual filling valve (not shown) and connects to a filling line 8. The line 8 is jacketed by a vent line 9 to result in a coaxial tubular conduit of extremely compact design. In service, the relatively cold vapor flowing via vent line or jacket 9 reduces heat flow from the outside to the said filling line 8 and prevents excess vaporization of liquids during filling, which, in turn, reduces the filling losses significantly if compared with conventional systems which do not employ such jacketing. In addition, jacketing the filling line 8 with the vent line or jacket 9 as shown in FIGURE 2 provides a compact, single vent port 10 for integral mounting of inboard vent valve 11, and outboard vent valve 12, as well as safety relief valve 13. These valves are mounted in lines which form junctures with the jacket or annulus 9. Their junctures may all be at the same location along the length of the jacket 9, or as shown, at least two of them may be so located (the lines of the valves 11 and 12). Arranging these lines to radiate in this manner from the single annulus 9 is extremely favorable from the standpoint of space conservation.

As shown in FIGURE 2, vapor connection 14, serving full trycock 15, and also serving pilot line 16, is also connected to the single vent port 10 to enable simple vapor distribution for actuation of other system controls. The vapor connection 14, serving said full trycock line 15, is provided with small valve 17, which is normally open during the filling operation. When the Dewar 1 is filled to the level controlled by a coaxial tank neck member 18, which controls the liquid level limits in the vessel, excess liquid escapes via vent channels 19, terminating in the vent port 10, and escaping through the full trycock valve 17. When the cryogenic fluid in the form of a heavy mist begins to flow through the said trycock 17, it signifies that the Dewar 1 is full, at which time the liquid supply valve at the storage tank and vent valves 11 and/or 12 in the control box, as well as trycock valve 17, should be closed for best economy.

Pilot line 16 is provided with a small shut-off valve 20, which enables single valve operation and control of both the liquid level gage 24 through the gas phase leg 21, and the pilot signal line 22, leading to the pneumatic controller 23. The liquid level gage 24 is also provided with a liquid phase leg and valve 25 directly fed from the Dewar 1. Valve 26, connecting the liquid and the gas phase legs of the liquid level gage 24, is used to zero balance the instrument. The liquid level gage 24, with the associated valves, is a standard component of both pneumatically and electrically operated systems, and normally it employs the same number of said small needle valves, identified by 20, 25, and 26. In the system proposed, valve 20 serves a dual purpose; namely, for liquid level gage 24 and for pilot line 22 shut-off, enabling system simplification.

Should the system be energized by liquid rather than vapor, pilot line 22 would be connected to the fill line 8 instead of to the line 16. The gas phase leg 21 of liquid level gage 24 would then be either attached to the vapor connection 16 or directly to the vapor chamber of the Dewar 1 at 18. Such an arrangement would eliminate the need for valves 20, 25, 26, and line 16, but a replacement valve would be required located between the controller 23 and bypass line 35 in the line 22.

The controller 23 is provided with an integrally mounted filter 28 and a small pressure gage 27 mounted within the pilot signal line 22. A controller-valve system is used which opens fully on low pressure supplied via vent line 19 and pilot lines 16 and 22, and the controller-valve system is practically insensitive to system vapor-pressure variation, over and above that considered the minimum required for the proper operation of the pneumatic temperature controller 23. This provision eliminates the need for a pressure regulator, which is normally required to be used in pneumatic systems ahead of controller 23 on pilot line 22. Elimination of the pressure regulator further simplifies the system controls and contributes to further reduction of the size of the control box used in the control system.

The pressure gage 27 identifies at all times system pressure and/or vapor pressure of the cryogenic Dewar 1. Should the pressure in the said cryogenic Dewar 1 drop below a pressure value preset by a pressure regulator 29, the regulator 29 opens to permit the flow of the cryogenic fluid via a pressure building circuit 30.

Figure 4:
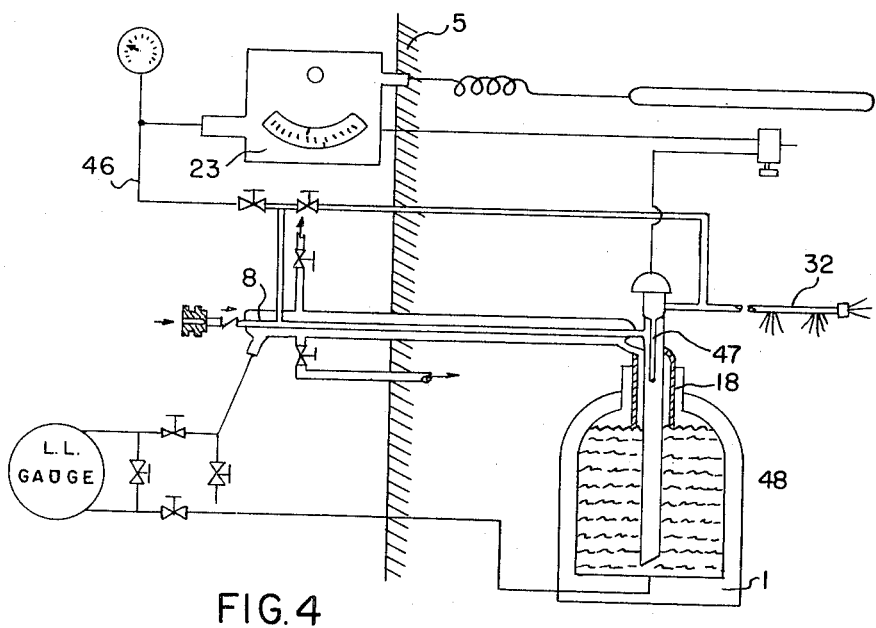

Liquefied gases flowing through the pressure building circuit 30 vaporize and increase vapor pressure within the Dewar 1, providing driving energy to the cryogenic fluid to escape via the flow valve 31 and spray line or header 32 for temperature control of the cargo compartment as required. In addition to the pressure regulator 29 in the pressure building circuit 30, the system described in FIGURE 2 employs a pneumatically operated valve 33, which controls the pressure building circuit during the filling operation. On filling, the Dewar normally is vented, which, in turn, provides a low pressure condition within the container. Since the pressure regulator 29 automatically opens the pressure building circuit when container pressure is low, during the filling operation part of the liquid becomes directed to the pressure building circuit 30, where it vaporizes and vents out, increasing filling losses. In the present system, however, the pneumatically operated valve 33 closes the pressure building circuit 30 when the filling operation starts. This is due to the fact that the filling pressure is normally higher than the Dewar pressure, which, in turn, creates a sufficiently high pressure signal in the pilot line 34 serving the pneumatic valve 33. This enables reduction of filling losses normally associated with systems that do not employ a pneumatically controlled valve such as the valve 33 in conjunction with a pressure building regulator such as the regulator 29. However, for systems that do not require pressure building circuits because of pressurization of the Dewar during the filling operation to a pressure value sufficient to provide necessary driving force to the cryogenic fluid during the period of service, further simplification of the system controls is evident, in that the pressure building circuit 30, pressure regulator 29, pneumatic valve 33, and the pilot line 34, may be completely omitted, depending upon the application requirements of the transport refrigeration systems. Such a system is illustrated in FIGURE 4, and will be described in greater detail in the following pages. This, of course, does not materially affect the size of the control box, as the components that are subject to omission are normally mounted directly on the Dewar.

In order to insure system operation in case of malfunction of the pneumatically controlled components described above, a liquid bypass line 35, with associated bypass valve 36, is provided for actuation from the control box. This provision is optional, in that its use may not be mandatory in the advanced system operation.

The pneumatic temperature controller 23, provided with temperature sensor 37, regulates the flow into the spray header 32 via pilot line 38 actuating flow control valve 31 when temperatures in the cargo compartment change from the preset value, adjustable by the control knob 39.

The pilot line 38 leading from the controller 23 may be provided with an integrally mounted door safety relief valve 40, which disengages flow control valve 31 when the door of the cargo compartment is opened. This makes it safer to enter the cargo compartment.

The system shown in FIGURE 2 and described above represents the most advanced system control concept for in-transit refrigeration systems, and provides an extremely compact control box housing for the basic operational system controls. It also enables reduction of gas evaporation during the filling operation, securing system economy not attainable with differently designed system controls.

FIGURE 3 illustrates an identical piping arrangement with necesary valving for the reduced filling losses, with the exception that the pneumatic temperature controller 23 is replaced by the electric temperature controller 41, which is energized by a battery 42, as an additional system component in the electrically controlled systems. The flow control valve 31 in this system is actuated by the electric signal to the coil 45, via electric leads 43, which replace the pilot lines 38. Also, the door valve 40, shown in FIGURE 2, is replaced by a simple electric contact switch 44. The electrically controlled system may or may not employ the pressure building circuit, identified by the components 29, 33, 34, and 30, depending upon the specific application of the transport refrigeration system, which may vary considerably, due to the nature of the cargo. Instead of manually operated valves 11 and/or 12, shown in FIGURE 3, the electric system may employ solenoid operated vent valves mounted directly to the Dewar 1, and provided with electric switches located in the control box for valve actuation remotely. Such changes would be considered economically feasible if the filling/refilling operations occurred over very long intervals, which may be the case with large capacity tanks. Otherwise, the described filling losses would dictate the use of the jacketed vent lines for electric system as well, in order to operate economically. Consequently, the best results in controlling filling losses could be obtained by the use in electrically controlled systems of a filling and venting design similar or identical to that described in FIGURE 2. In particular, this is true considering that the sizes of the controls, as proposed in the subject invention, are significantly smaller than those in the conventional systems, rendering both pneumatic and electric system controls compact, inexpensive, and economical to operate.

FIGURE 4 illustrates a system which does not employ a pressure building circuit such as that constituted by the components 29, 33, 34, and 30 in FIGURE 2. The system shown in FIGURE 4 is otherwise basically the same as in FIGURE 2, with the following additional modification. Whereas the pneumatic controller in FIGURE 2 is actuated by the pilot line 22 receiving the signal from the vapor space identified by vent channels 19 and 10, via pilot lines 14 and 16 and valve 20, in FIGURE 4, the same pneumatic controller receives the signal from the pilot line 46 connected to the jacketed filling line 8, terminating with a diptube 48 immersed in the refrigerant. The signal for the pilot line 46 is received via fill line 8 and diptube 48, which employs liquid rather than vapor for pilot operation of the controller 23. Liquid displaces less volume in the Dewar 1 than vapor does, thereby maintaining adequate system pressure and enabling extended service of the system after the initial pressurization at filling, and eliminating the need for a pressure building circuit. In order not to disturb the flow of the refrigerant via the spray header 32, the Dewar 1 is provided with a liquid withdrawal line 47, coaxial to the diptube 48, terminating with jacketed filling line 8. The apparatus described in FIGURE 4 provides an extremely simple control system.

Figure 5:
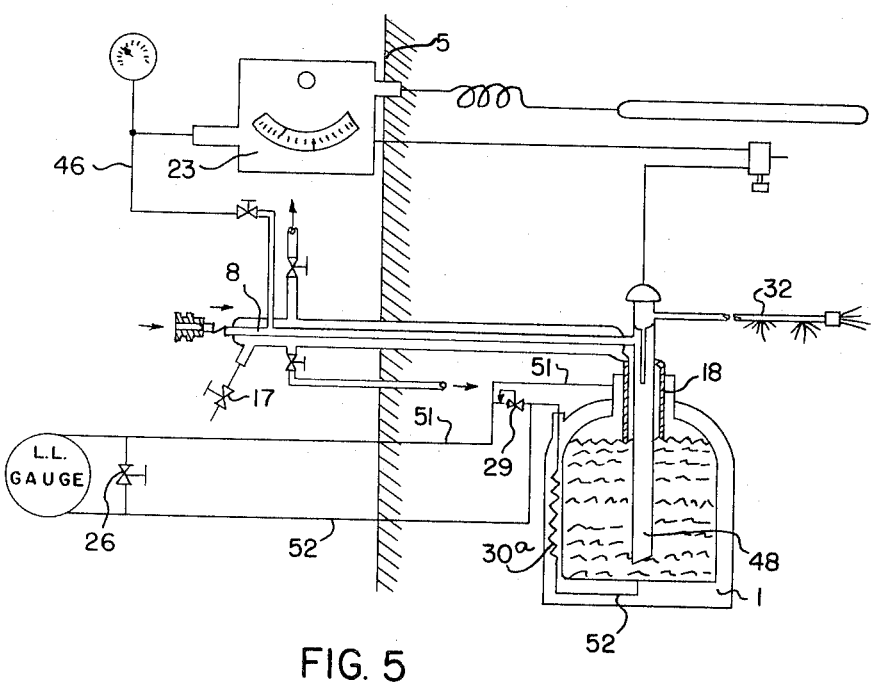

FIGURE 5 illustrates a system which may be generally the same as the system in FIGURE 2, but with provision for high reliability through the employment of pressures build-up capability without the use of separate lines for a pressure building circuit.

As in the earlier figures, the pressure builder 30a illustrated in FIGURE 5 may consist of one or several coils or wraps around the vacuum slot between the inner and outer container vessels. In the intended operation of systems of this type, assuming all connections are tight so that there is no leakage, heat inleak will be such that adequate gas pressure is maintained above the liquid level of the container, thus assuring sufficient gas pressure to drive the liquid to the spray header 32. A manual valve 26 is normally closed and a pressure activated valve 29 is also normally closed so long as there is sufficiently high pressure in a line 51 communicating from the gas phase of the container. The line 51 serves as a first line to the liquid level gage. A line 52 serves as the second line from the liquid level gage. The pressure building coil 30a is serially connected in and constitutes part of the line 52.

The portions of the liquid level gage to which the lines 51 and 52 lead are closed from each other in the sense that they do not communicate internally of the gage. Therefore when the valves 26 and 29 are closed, the line 52 is closed off from the line 51. The operation of the pressure building coil 30a is substantially suspended because the pressure building coil is not vented to the gas phase of the container.

However, when either the valve 26 or the valve 29 is opened, the pressure building coil 30a becomes vented through the line 51 to the gas phase of the container, thereby somewhat relieving pressure at the upper portions of the pressure building coil and admitting more liquid to the bottom of the coil for vaporization and pressure building.

Opening either of the valves 26 and 29 of course results in a bypass of the liquid level gage. The lines in which the valves 26 and 29 are located amount to shunt lines which bypass the liquid level gage. When either of these valves is open, proper operation of the liquid level gage is interfered with. However in uses such as over-the-road transport, the system shown in FIGURE 5 is very practical. Prior to the start of truck runs, the container charge is checked and the container is filled if necessary by using the liquid level gage. At this time the valves 26 and 29 remain closed. Normally they are closed during transport, the operation of the pressure building coil 30a is substantially suspended, and the liquid level gage gives accurate indications.

If the system is improperly pressurized initially, or should loose connections or other causes result in some leakage in the system during transport, spoilage of the shipment becomes a possibility. Gas pressure may reach such an abnormally low level that the spray head may not operate when called upon to do so, and the contents of the refrigerated shipment are in danger of overheating. But with the illustrated system, if such abnormally low pressure level occurs, the automatic valve 29 will open. The pressure building coil will then begin to operate and pressure will be maintained on an emergency or abnormal basis. The liquid level gage may move erratically, indicating to the driver that an emergency condition exists, and that the system must be checked at the earliest opportunity.

Since the pressure building coil 30a is in the line 52 leading to the liquid level gage, the emergency pressure-building capacity of the system and resulting reliability is achieved at small increased cost as compared to that inherent in the provision of a liquid level gage circuit. All that is required are an increase in the length of the line 52 by one or several turns to constitute the coil 30a, the shunt lines for one or the other or both the valves 26 or 29, and one or the other or both the valves themselves. The manual valve 26 and its shunt line may be eliminated, or the automatic valve 29 and its shunt line may be eliminated. If only the manual valve is provided, a severe drop in pressure will not automatically bring the pressure-building coil into operation, but during stops in transit the operator may merely observe the temperature of the cargo compartment and open the manual valve if the temperature is alarmingly high.

The invention is not restricted to the slavish imitation of each and every one of the details and features described above, which have been set forth merely by way of example, with the intent of most fully setting forth the teaching of the invention. Obviously, devices may be provided which change, eliminate, or add certain specific structural details without departing from the invention.

What is claimed is:

1. In a system for cooling the insulated cargo space of a refrigeration transport vehicle by evaporation of liquefied gas, a control box external to the insulated cargo space, a liquefied gas container, spray line means in the cargo space, a fluid network partly in said control box and partly in the insulated cargo space, said network including valves and lines for filling said container and venting it during filling and for controllably supplying fluid to said spray line means, said network including coaxial conduit means communicating between the container and the externally located control box, said coaxial conduit means including both filling line means and venting line means.

2. In a system for cooling the insulated cargo space of a refrigeration transport vehicle by evaporation of liquefied gas, a control box external to the insulated cargo space, a liquefied gas container, spray line means in the cargo space, a fluid network partly in said control box and partly in the insulated cargo space, said network including valves and lines for filling said container and venting it during filling and for controllably supplying fluid to said spray line means, said network including coaxial conduit means communicating between the container and the externally located control box, said coaxial conduit means including both filling line means and venting line means, said coaxial conduit means including an inner fill line surrounded by a vent line jacket or annulus.

3. In a system for cooling the insulated cargo space of a refrigeration transport vehicle by evaporation of liquefied gas, a control box external to the insulated cargo space, a liquefied gas container, spray line means in the cargo space, a fluid network partly in said control box and partly in the insulated cargo space, said network including valves and lines for filling said container and venting it during filling and for controllably supplying fluid to said spray line means, said network including coaxial conduit means communicating between the container and the externally located control box, said coaxial conduit means including both filling line means and venting line means, said coaxial conduit means including an inner fill line surrounded by a vent line jacket or annulus, said network including two or more valved lines radiating from said jacket or annulus.

4. In a system for cooling the insulated cargo space of a refrigeration transport vehicle by evaporation of liquefied gas, a control box external to the insulated cargo space, a liquefied gas container, spray line means in the cargo space, a fluid network partly in said control box and partly in the insulated cargo space, said network including valves and lines for filling and venting said container and controllably supplying fluid to said spray line means, said network including coaxial conduit means communicating between the container and the externally located control box, said coaxial conduit means including both filling line means and venting line means, said coaxial conduit means including an inner fill line surrounded by a vent line jacket or annulus, said network including a pressure actuated dispensing valve, a control circuit for providing a demand modulating pressure signal to said dispensing valve, the pressure for said circuit being supplied by a line connected to said jacketed fill line.

5. Apparatus as in claim 4 in which said connection is located externally of said cargo space.

6. In a system for cooling the insulated cargo space of a refrigeration transport vehicle by evaporation of liquefied gas, a control box external to the insulated cargo space, a liquefied gas container, spray line means in the cargo space, a fluid network partly in said control box and partly in the insulated cargo space, said network including valves and lines for filling and venting said container and controllably supplying fluid to said spray line means, said network including coaxial conduit means communicating between the container and the externally located control box, said coaxial conduit means including both filling line means and venting line means, a filling connection, and a check valve between said filling connection and said filling line means and allowing fluid flow only in the fill direction.

7. In a system for storing and dispensing liquefied gas, a liquefied gas container, a fluid network including valves and lines for filling and venting said container and dispensing fluid therefrom, said network including a fill line, a pressure building circuit for said container, a normally closed valve in said pressure building circuit, means for opening said normally closed valve when the pressure in said container drops below a pre-set value to thereby establish a demand-responsive pressure-building circuit, a normally open shut-off valve in said pressure building circuit, means for closing said normally open shut-off valve when the pressure in said fill line exceeds the pressure in said container by a given amount, as during filling, whereby there is a minimization of any waste occasioned by the concurrent filling and venting of the container.

8. In a system for storing and dispensing liquefied gas, a liquefied gas container, a fluid network including valves and lines for filling and venting said container and dispensing fluid therefrom, said network including a pressure-actuated dispensing valve and a control circuit for providing a demand-modulated pressure signal to said dispensing valve, the pressure for said control circuit being supplied through a common line leading from the gas phase of said liquefied gas container, said common line leading also to the top of a liquid level gage and forming part of a circuit for said gage which circuit in turn forms part of said fluid network, a single shut-off valve in said common line for isolating the gas phase of said liquefied gas container from the remoter parts of both said control circuit and said circuit for the liquid level gage.

9. In a system for storing and dispensing liquefied gas, a liquefied gas container, a fluid network including valves and lines for filling and venting said container and dispensing fluid therefrom, said network including a pressure building circuit, and also including a pressure-actuated dispensing valve and a control circuit for providing a demand-modulated pressure signal to said dispensing valve, said control circuit including a controller for modulating said pressure signal in response to sensed temperatures, the pressure for said control circuit being supplied through a line leading from the gas phase of said liquefied gas container, said pressure building circuit including means for maintaining a given normal gas phase pressure within said container during normal operation thereof, said controller and dispensing valve having the capacity, upon demand, to establish a fully open condition of the dispensing valve at a gas phase pressure of only a minor fraction of said normal gas phase pressure, said supply line for said control circuit having no pressure regulator therein.

10. In a system for storing and dispensing liquefied gas, a liquefied gas container, a fluid network including valves and lines for filling and venting said container and dispensing fluid therefrom, said network including a pressure-actuated dispensing valve and a control circuit for providing a demand-modulated pressure signal to said dispensing valve, said control circuit including a controller for modulating said pressure signal in response to sensed temperatures, the pressure for said control circuit being supplied through a line that is isolated from the ullage space of said liquefied gas container but that does lead from the liquid phase of said liquefied gas container.

11. In a system for storing and dispensing liquefied gas, a liquefied gas container, a fluid network including valves and lines for filling and venting said container and dispensing fluid therefrom, said network including a first line leading from the gas phase of said liquefied gas container to one port means of a liquid level gage, a second line leading from the liquid phase of said liquefied gas container to another port means of the liquid level gage, said second line consisting in part of a pressure-building coil in series in the line whose operation is substantially suspended during absence of venting of the coil to the gas phase of the container, said first and second port means of the liquid level gage being closed from each other whereby said first and second lines do not communicate and the venting of said pressure-building coil is cut off in the absence of any bypassing of said liquid level gage, at least one shunt line means between said first and second lines, valve means in said shunt line means for normally closing said first and second lines from each other but openable to bypass said liquid level gage and establish venting of said coil to the gas phase of the container to bring the pressure-building coil into operation.

12. In a system for storing and dispensing liquefied gas, a liquefied gas container, a fluid network including valves and lines for filling and venting said container and dispensing fluid therefrom, said network including a fill line, a pressure building circuit for said container, a normally closed valve in said pressure building circuit, means for opening said normally closed valve when the pressure in said container drops below a pre-set value to thereby establish a demand-responsive pressure-building circuit, additional shut-off valve means for automatically closing said pressure-building circuit, without venting said circuit to atmosphere, during concurent filling and venting of said container, and despite the opening of said first mentioned normally closed valve.

13. In a transport system for storing and dispensing liquefied gas, an insulated cargo space, a liquefied gas container, a fluid network including valves and lines for filling and venting said container and dispensing fluid therefrom, said network including a pressure-actuated liquid-gas dispensing valve in a line leading to spray line or spray header means in the cargo space and a pneumatic control circuit for providing a demand-controlled pressure signal to said dispensing valve, said control circuit including a controller for controlling said pressure signal in response to sensed temperatures, the pressure for said control circuit being supplied through a line leading from said liquid gas container, the open position of said dispensing valve being established by internal container pressure acting through said controller.

References Cited by the Examiner

UNITED STATES PATENTS

| | | | |
|---|---|---|---|
| 966,076 | 8/1910 | Bobrick | 62—45 X |
| 2,479,867 | 8/1949 | Rosebaugh | 62—514 X |
| 2,751,882 | 6/1956 | Coyner | 62—64 X |
| 2,850,882 | 9/1958 | Starnes | 62—52 |
| 2,958,204 | 11/1960 | Spaulding | 62—52 X |
| 3,091,096 | 5/1963 | Rendos et al. | 62—52 X |
| 3,093,974 | 6/1963 | Templer et al. | 62—52 X |
| 3,096,626 | 7/1963 | Morrison | 62—64 |
| 3,127,755 | 4/1964 | Hemery | 62—267 |
| 3,241,329 | 3/1966 | Fritch et al. | 62—267 |
| 3,255,597 | 6/1966 | Carter | 62—267 |
| 3,287,925 | 11/1966 | Kane et al. | 62—239 |

LLOYD L. KING, *Primary Examiner.*